(12) United States Patent
Klarmann et al.

(10) Patent No.: US 8,096,505 B2
(45) Date of Patent: Jan. 17, 2012

(54) DECELERATION DEVICE FOR A COCKPIT DOOR FOR DECELERATING IN CASE OF DECOMPRESSION

(75) Inventors: Arne Klarmann, Hamburg (DE); Nick Chignell-Stapleton, Sittensen (DE)

(73) Assignee: Airbus Deutschland GmbH (DE)

( * ) Notice: Subject to any disclaimer, the term of this patent is extended or adjusted under 35 U.S.C. 154(b) by 700 days.

(21) Appl. No.: 12/231,289

(22) Filed: Aug. 29, 2008

(65) Prior Publication Data

US 2009/0057490 A1 Mar. 5, 2009

Related U.S. Application Data

(60) Provisional application No. 60/967,005, filed on Aug. 31, 2007.

(30) Foreign Application Priority Data

Aug. 31, 2007 (DE) .......................... 10 2007 041 387

(51) Int. Cl.
*B64D 11/06* (2006.01)

(52) U.S. Cl. ............ 244/122 R; 297/216.1; 297/216.16; 297/216.17; 244/129.5

(58) Field of Classification Search .............. 244/122 R, 244/129.5; 297/216.1, 216.3, 216.16, 216.17
See application file for complete search history.

(56) References Cited

U.S. PATENT DOCUMENTS

| 4,223,763 | A | 9/1980 | Duclos et al. | |
| 5,234,181 | A | 8/1993 | Schroth et al. | |
| 6,378,939 | B1 * | 4/2002 | Knoll et al. | 297/216.1 |
| 6,585,190 | B2 * | 7/2003 | Mort | 244/122 R |
| 7,712,705 | B2 * | 5/2010 | French | 244/129.5 |

FOREIGN PATENT DOCUMENTS

| DE | 41 17 405 A1 | 12/1992 |
| DE | 43 12 343 C2 | 10/1994 |
| DE | 198 57 927 A1 | 10/1999 |
| DE | 199 26 085 A1 | 12/2000 |
| DE | 601 07 793 T2 | 8/2005 |
| GB | 2 334 319 A | 8/1999 |

* cited by examiner

*Primary Examiner* — J. Woodrow Eldred
(74) *Attorney, Agent, or Firm* — Lerner, David, Littenberg, Krumholz & Mentlik, LLP (57) ABSTRACT

A deceleration device for a movable component in an aircraft, the device having a deformation component, wherein the deformation component includes a deformation tool, a deformation body with a deformable region, and a guide device. The deformation tool and the deformation body can be made to engage each other in such a manner by means of the guide device that in the case of movement of the deformation body and of the deformation tool relative to each other the deformable region of the deformation body can be deformed by the deformation tool.

12 Claims, 6 Drawing Sheets

Fig. 10

DECELERATION DEVICE FOR A COCKPIT DOOR FOR DECELERATING IN CASE OF DECOMPRESSION

CROSS-REFERENCE TO RELATED APPLICATIONS

This application claims the benefit of the filing date of U.S. Provisional Patent Application No. 60/967,005 filed Aug. 31, 2007, the disclosure of which is hereby incorporated herein by reference.

BACKGROUND OF THE INVENTION

The present invention relates to a deceleration device for a movable component in an aircraft, in particular to a deceleration device for a cockpit door for decelerating or reducing the speed in the case of decompression, to a cockpit door device comprising such a deceleration device, and to an aircraft comprising a deceleration device for decelerating a movable component in an aircraft.

An aircraft comprises a multitude of movable components which in the case of decompression, i.e. a loss of pressure, are then accelerated due to the resulting strong air stream relative to the aircraft. In particular in the case of doors or flaps that close more or less closed-off spaces in an aircraft, due to the relatively large door- or flap surfaces significant forces are experienced if there is a great pressure difference, which forces act upon a door or flap, thus being able to accelerate said door or flap. For such incidents, which can, for example, occur as a result of the loss of a window with a subsequent strong air stream, and which can result in considerable acceleration of, for example, door elements, deceleration devices are provided in aircraft, which deceleration devices, when certain limiting values of acceleration are exceeded, absorb forces that occur during decompression and in a suitable manner compensate said forces in a controlled way, thus preventing the door suspension as such from experiencing structural failure and thus in the case of decompression becoming an uncontrollably-moved component with a very considerable potential for destruction and injury.

However, such deceleration systems should be able to be set such that, for example in the case of a cockpit door, they allow quick opening and release of a cross section, however in the case of an adequately-sized opening they should generate an increased deceleration effect so that after the initial opening process defined deceleration and compensation of the kinetic energy built up in the accelerated moving component can take place.

SUMMARY OF THE INVENTION

It may be considered as an object of the present invention to provide a deceleration device that permits defined deceleration of a movable component in an aircraft.

The object of the present invention is met by deceleration devices or cockpit doors disclosed herein. For example, in one embodiment a deceleration device for a movable component in an aircraft, where the deceleration device comprises a deformation component, the deformation component comprising a deformation tool, a deformation body with a deformable region, and a guide device. The deformation tool and the deformation body can be made to engage each other in such a manner by the guide device that in the case of movement of the deformation body and of the deformation tool relative to each other the deformable region of the deformation body can be deformed by the deformation tool. Further exemplary embodiments of the invention are also provided herein.

According to an exemplary embodiment, a deceleration device for a movable component in an aircraft is provided with a deformation component, wherein the deformation component comprises a deformation tool, a deformation body with a deformable region, and a guide device, wherein the deformation tool and the deformation body can be made to engage each other in such a manner by the guide device that in the case of movement of the deformation body and of the deformation tool relative to each other the deformable region of the deformation body can be deformed by the deformation tool.

In this way in the case of decompression a movable component in an aircraft, which movable component moves relative to the aircraft, for example driven by a strong air stream, can be decelerated if it is linked to such a deceleration device, in that the kinetic energy of the movable component by deformation of a deformable region of a deformation body is converted to deformation energy by a deformation tool. In contrast to known devices, such a deceleration device is not based on reversible deformation of, for example, a spring, but instead on non-reversible deformation of a deformable region. In this way, with the device according to the invention, the kinetic energy of a movable component can be converted in a controlled manner to deformation energy in a deformable region, namely so that the kinetic energy that is being generated can be reduced in a controlled manner in the movable component. The basic principle of converting kinetic energy to deformation energy is known in the field of motor vehicles in the design of collapsible zones or crumple zones. However, in the case of the present invention the deformation is carried out in a directed manner by a guide device and is realised as a direction-controlled deceleration principle. Since, as a rule, a decompression case in an aircraft represents a serious malfunction, after decompression the aircraft is subjected to close inspection, part of which may also involve the exchange of a deformation device that was deformed in the deformable regions, so that there is no need to provide a deceleration device that can be used repeatedly.

According to an exemplary embodiment of the invention, a deceleration device is provided which furthermore comprises a first component and a second component, wherein the first component can be connected to a fixed component of an aircraft, and the second component can be connected to a movable component in an aircraft, wherein the deformation device interconnects the first component with the second component such that the first component can be decelerated relative to the second component by deformation of the deformable region.

In this way coupling components in the form of a first component and a second component are provided which can, for example, be adapted such that they can be attached at suitable locations in an aircraft, and furthermore can comprise devices which, for example in the case of decompression or in the case of some unexpected deceleration, connect a movable component in an aircraft to the fixed component of an aircraft such that the movable component in an aircraft can be decelerated, in a controlled manner and without causing further damage, by deforming a deformable region.

According to an exemplary embodiment of the invention, the deformable region is guided on an essentially circular path on an axis of rotation, wherein the deformation tool is arranged so as to be eccentric in relation to the axis of rotation.

In this way the deceleration device can be constructed so as to be relatively compact, because the deformable region can be arranged quasi in a curved or circular track that saves space, wherein the eccentrically arranged deformation tool can act upon the deformable region.

According to an exemplary embodiment of the invention, the deformable region comprises an essentially circular contour, wherein the deformation tool acts upon the circular contour for deformation.

It should be noted that the deformable region can be situated on the external circumference of a circular contour, or on the inside of a ring-shaped arrangement that can also comprise a circular interior contour. In this arrangement, it is possible to move both the deformable region along the deformation tool, and the deformation tool along the deformable region. In both cases the deformation tool affects the deformable region such that the deformable region is subjected to deformation as a result of a relatively great energy input, wherein this energy originates from the kinetic energy of the movable component to be decelerated.

According to an exemplary embodiment of the invention, the circular contour comprises a recess which the deformation tool engages. In this way the deformation tool can be placed into the essentially circular path of the deformable region, without there being any need, in the case of deformation, to move said deformation tool radially to the deformable region. If the tool moves relative to the deformable region, the deformation tool that is located in the recess is, for example, moved to a flank of the recess. As a result of, for example, a circular movement of the deformation body the tool is moved to the deformable region and subsequently acts upon the deformable region and deforms this region of the deformation body as the, for example, circular movement continues.

According to an exemplary embodiment of the invention, the deformable region is designed to be deformed by flanging.

This makes possible defined deformation and defined energy input in the deformable region, as well as a defined change in geometry that prevents the deceleration device from reacting in an unforeseen manner as a result of an unforeseen change in geometry, i.e. it prevents the deceleration device from carrying out a deceleration process that is no longer defined and foreseen.

According to an exemplary embodiment of the invention, the deceleration device comprises a multitude of deformation bodies, wherein each of the multitude of deformation bodies comprises a driver element that can be made to engage a driver element of another deformation body such that as a result of a movement of a deformation body the movement of another deformation body can be caused.

In this way deformation processes on several deformation bodies can be coupled. However, it is not only possible to bring about direct coupling of a multitude of deformation bodies, but, for example, also to bring about certain free-running states of the various deformation bodies relative to each other. Such free running can take place over a certain distance before the driver elements engage, so that the driver elements engage each other only after free running was active for a certain distance, and thus staged coupling of the multitude of deformation bodies can take place. In this way it is possible, over a certain distance, to specify which deformation bodies and how many deformation bodies can be made to move in sequence or at the same time in order to absorb deformation energy by deformation of a deformable region provided thereon, which deformation energy results from the kinetic energy of a moved component.

According to an exemplary embodiment of the invention, the multitude of deformation bodies are held, side-by-side, on a shared axis of rotation, wherein a driver element of a deformation body can be made to act upon a driver element of an adjacent deformation body.

With a corresponding design of the multitude of deformation bodies and the setting of free-running states before driver elements of two adjacent deformation bodies act upon each other, deceleration characteristics over a certain distance can be set. For example, if an initially slight deceleration in the course of the deceleration path is to be increased, then the provided free-running paths of adjacent deformation bodies to adjacent deformation bodies are successively shortened so that a multitude of deformation bodies are deformed in parallel, thus experiencing considerable energy input. A deformation pause or a delay in deformation can be achieved by installing an intermediate body onto the shared axis of rotation, wherein the geometry of this intermediate body is essentially identical to that of a deformation body except that the former does not comprise a region provided for deformation, as it were a blank coupling disc. It should be noted that the force-input takes place by way of one of the deformation bodies, as a rule the frontmost deformation body, wherein, as a result of the movable bearing of the multitude of deformation bodies relative to each other on the axis of rotation, and as a result of the arrangement of the driver elements, force input also on the adjacent deformation body only takes place when the driver elements act upon adjacent deformation bodies.

According to an exemplary embodiment of the invention, the deformation body comprises a first deformation body component and a second deformation body component, wherein the first deformation body component comprises the deformation region, the second deformation body component comprises the driver element, and the first deformation body component and the second deformation body component can be fixed at different angular positions relative to each other.

In this way, in particular in the case of an arrangement of several deformation bodies on a shared axis of rotation, the recesses of all the deformation bodies can be arranged in a coincident angular position so that a single deformation tool can be used for each one of a multitude of deformation bodies, however, the positions of the respective driver elements can be set differently depending on the desired deceleration characteristics, without there being a need for each application case to provide a separate deformation body with a corresponding position of the driver elements in relation to the recess. In other words, producing a single geometry for a first deformation body component, and producing a single geometry for a second deformation body component is sufficient so that, as a result of a corresponding composition and affixation in various angular positions relative to each other, in each case deformation bodies can be made from a first and a second deformation body component, which comprise a different angular position of the recess and the driver element.

According to an exemplary embodiment of the invention, the first deformation body component and the second deformation body component together are toothed with a regular tooth arrangement.

In this way fixation in various angular positions can take place according to the tooth arrangement division. It should be noted that it is not mandatory for the first deformation body component and the second deformation body component to have the same number of teeth, but instead one of the two components can have a regular tooth arrangement comprising a large number of teeth while the other component can have only individual teeth that can be fixed in different angular positions in relation to each other with the corresponding component. However, it is also possible to provide certain tooth arrangement patterns in order to make possible affixation only in certain angular positions. Of course, an irregular tooth arrangement can also be used.

According to an exemplary embodiment of the invention, the deformation tool is a pin.

A pin-shaped deformation tool is relatively simple to manufacture, wherein a pin geometry is relatively simple to harden and simple to install, without there being a need to pay attention to an angular position. Furthermore, a pin is suitable to be able to engage a multitude of corresponding recesses of deformation bodies that are arranged side-by-side on a shared axis of rotation.

According to an exemplary embodiment of the invention, in each case the pin engages a recess of a multitude of deformation bodies, wherein the multitude of deformation bodies are movably held side-by-side on a shared axis of rotation.

According to an exemplary embodiment of the invention, a cockpit door device is provided, comprising a door frame, a door leaf and a deceleration device according to the invention, wherein a first component of the deceleration device is connected to the door frame, and a second component of the deceleration device in the case of decompression can be connected to the door leaf, wherein the deceleration device interconnects the door frame with the door leaf in the case of decompression such that the door leaf can be decelerated relative to the door frame by deforming a deformable region.

With such an arrangement a cockpit door device can be designed such that in a normal case of operation the deceleration device, which is firmly connected to a door frame, is not connected to the door leaf, but instead, a connection between the deceleration device and the door leaf takes place only in the case of decompression and associated very considerable acceleration, as a result of the inertia of certain elements, so that the deceleration device only decelerates the movement of the door leaf if a limiting acceleration is exceeded, while in the normal operational case it releases the door leaf.

According to an exemplary embodiment of the invention, an aircraft is provided with a fixed component and a deceleration device according to the invention, wherein a first component of the deceleration device is connected to the fixed component of the aircraft, and a second component of the deceleration device can be connected to a movable component in an aircraft, wherein the deceleration device in the case of extraordinary acceleration interconnects the fixed component of the aircraft with a movable component in the aircraft such that a movable component can be decelerated relative to the fixed component of the aircraft by deformation of a deformable region.

In this way an aircraft with a deceleration device is provided, which is not only in a position, for example, to decelerate a cockpit door in the case of decompression, but, for example, with a suitable design also to decelerate other movable objects in an aircraft, for example trolleys or roll containers.

The individual characteristics described above can, of course, also be combined, as a result of which in part it is also possible to achieve advantageous effects that go beyond the sum of individual effects.

These and other aspects of the present invention are explained and clarified with reference to the exemplary embodiments described below.

BRIEF DESCRIPTION OF THE DRAWINGS

Below, exemplary embodiments are described with reference to the following drawings.

DETAILED DESCRIPTION

Figure 1:
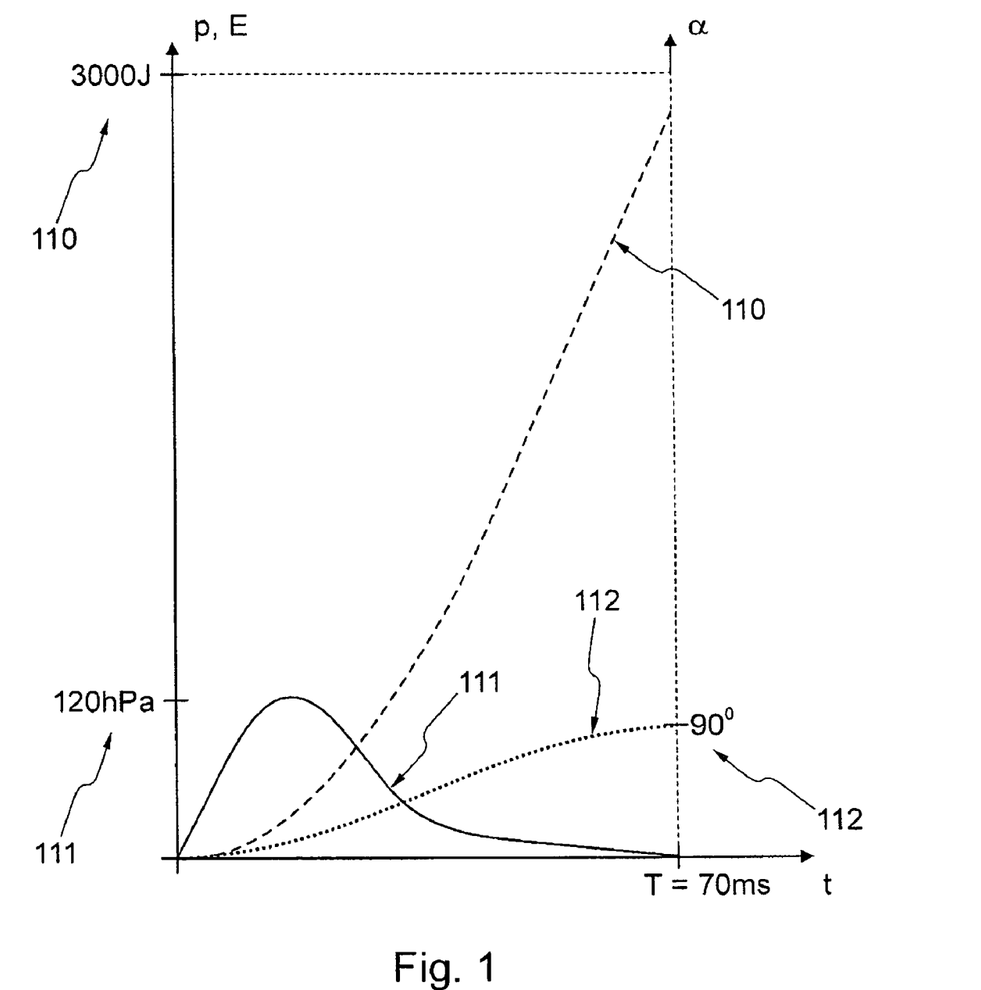
FIG. 1 shows the progression over time of energy, pressure, and door angles.

FIG. 1 shows progression over time of kinetic energy of an opening door 110, progression over time of a pressure build-up 111, and progression over time of a door opening angle 112. As shown in the diagram in FIG. 1, the quantity of energy contained in a door which opens rises overproportionally steeply over time in the case of decompression, and in this exemplary case reaches a maximum at a maximum door opening of 90° after approximately 70 ms. However, the maximum pressure differential already occurs at very small door opening angles; it drops relatively quickly, in particular because the opening door releases the opening. Therefore, at this location, the deceleration process can be initiated significantly earlier and need not take place only at a door opening angle of 90°, at which also relatively high kinetic energy in the cockpit door is present.

Figure 2:
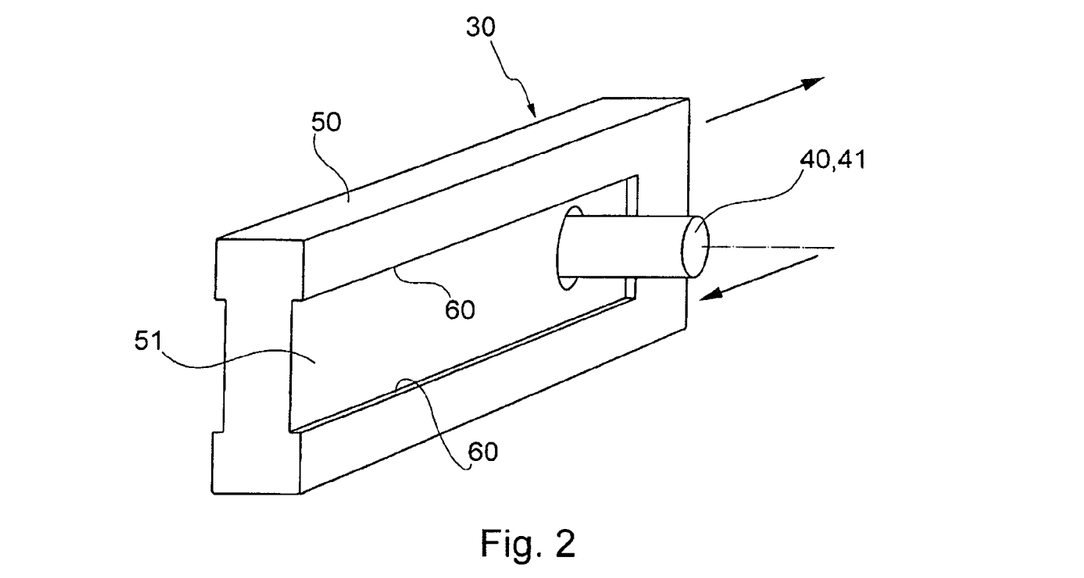
FIG. 2 shows a diagrammatic arrangement of a deceleration device according to one embodiment of the invention.

FIG. 2 shows a diagrammatic design of a deceleration device in which a deformation component 30 is provided. The deformation component 30 comprises a deformation tool 40, in the example shown in the form of a pin 41, a deformation body 50 comprising a deformable region 51, and a guide device 60. If, for example, a force is exerted along the arrows shown in FIG. 2, i.e. if the pin 41 is pulled in the direction of the region comprising less material thickness, then, with a corresponding design of the deformable region 51, the deformation tool 40 can deform this deformable region 51. This can, for example, take place by tearing or by displacement, as a result of which the energy introduced in the direction of the arrows into the deformation tool 40 is converted to deformation energy. A guide device 60 can, for example, be achieved in the form of a wider design of the edge regions for guiding the pin 41, so that in the embodiment shown in FIG. 2 the deformation tool 40 in the form of a pin 41 cannot break out laterally, thus unintentionally deforming regions of the deformation body, which regions are not intended to be formed or deformed. By a particular design of the deformable region 51 itself, a deceleration characteristic can be set, which depending on the deceleration distance causes a different energy input into the deformable region 51, relative to the path traveled in this process. For example, the deformable region 51 can comprise a wall thickness that varies so that in regions where the wall is thinner, during deformation the energy input for each travel path is less than it is in regions where the wall is thicker.

Figure 3:
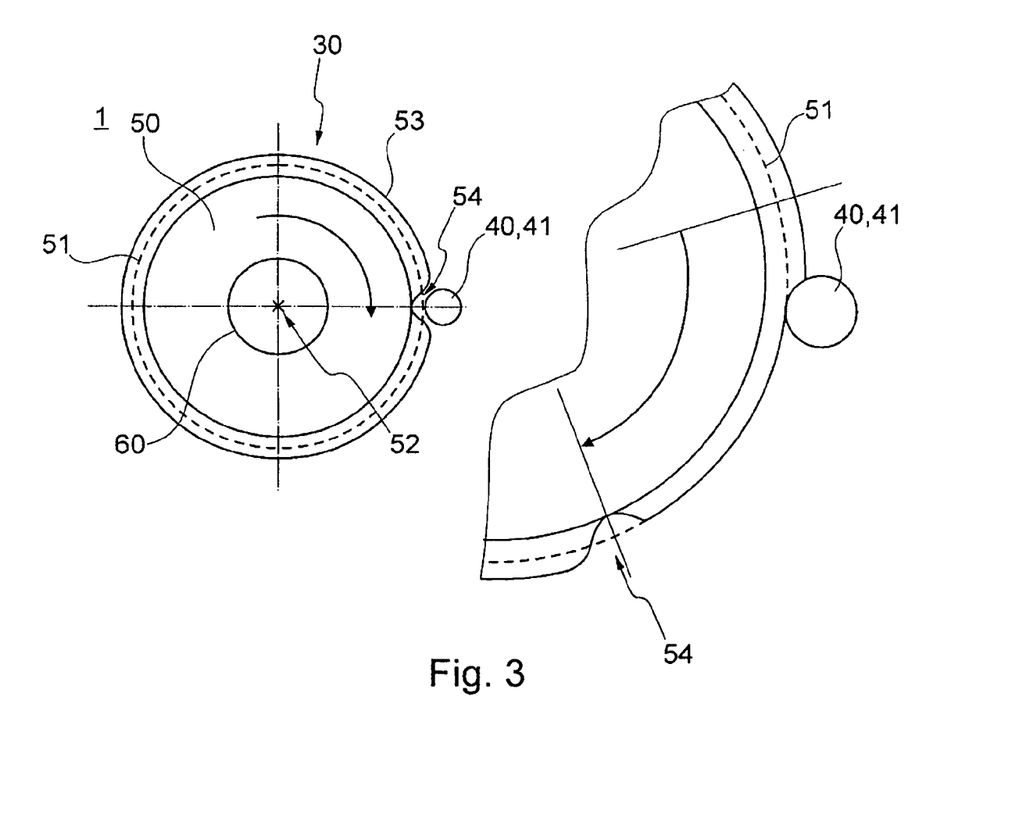
FIG. 3 shows a further exemplary embodiment of the invention.

FIG. 3 shows an exemplary embodiment, according to the present invention, in which the deformation body is provided in the form of an essentially circular disc, wherein on the outer circumferential contour 53 of said disc, which outer circumferential contour 53 is also essentially circumferential, a deformable region 51 is provided. By means of a guide device 60 the deformation body 50 with the deformation region 51 shaped to it, during rotary movement on an axis 52 of rotation, is held to the central position on the axis of rotation 52 so that the deformation tool 40, 41 during movement in the direction of the arrow acts upon a flank of the recess 54. If by means of a guide device 60 the axis 52 of rotation is kept constant to the position of the deformation tool 40, during further rotary movement in the direction of the arrow the deformation tool 40 will deform the deformable region 51 of the deformation body accordingly, as a result of which a force or energy introduced into the deformation body in the direction of arrow is converted to deformation energy in the deformable region 51. The beginning of such a process is shown in the enlarged view of FIG. 3, in which the deformation tool 40 is no longer situated in the recess 54 but instead has already deformed some of the circumference of the deformable region 51 so that said region 51 has already absorbed some of the energy which was fed to the deformation body 50 in the form of kinetic energy. This can, for example, take place by flanging or by flattening the deformable region. The manner of the deformation process can, for example, be influenced by the surface design of the deformation tool 40, and also by the design of the deformable region. When the deformation body has completed a movement along an almost complete circular path, then the deformation tool 40 will again be opposite the recess 54 so that the deformable region 51 has been deformed in the circumference provided. If the deformation tool 40 is not tracked accordingly, in the case of a further rotation of the deformation body there is no longer any further deformation; however, energy input into the deformation body takes place as a result of friction between the deformation tool 40 and the surface of the deformable region 51 of the deformation body 50.

Figure 4:
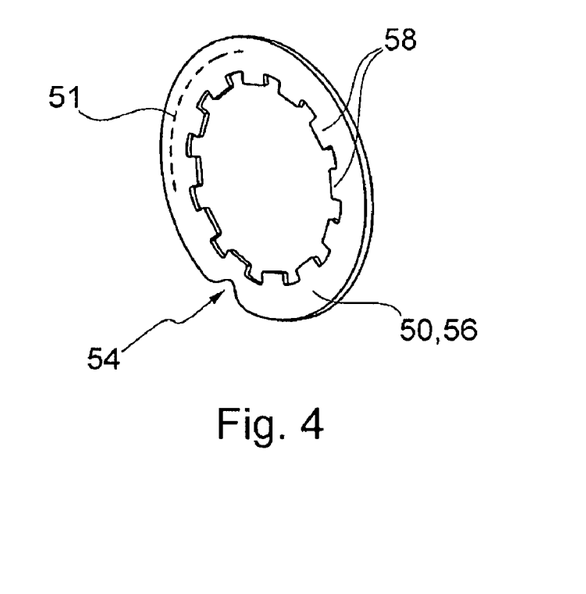
FIG. 4 shows a first deformation body component.

FIG. 4 shows a first deformation body component 56 of a deformation body 50, which on the outer circumference comprises a deformable region 51, wherein in this embodiment a recess 54 is also provided. The first deformation body component 56 shown is designed in the form of a ring which on its inside comprises a regular tooth arrangement 58. It is not mandatory for this tooth arrangement to be a rectangular tooth arrangement; instead, it can also be a wave-shaped or a triangular tooth arrangement. Likewise, it is not necessary for the tooth arrangement to be regular; instead, it can be in a certain pattern, for example in order to permit only certain angular positions.

Figure 5:
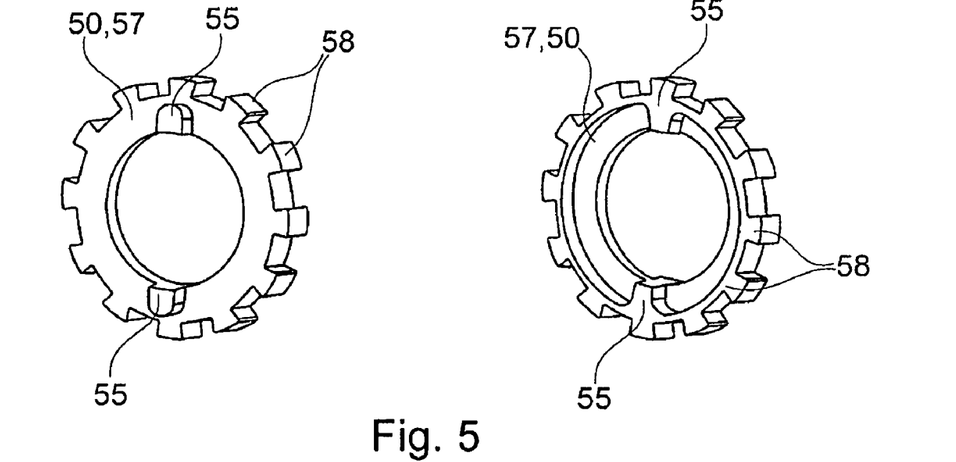
FIG. 5 shows a second deformation body component.

FIG. 5 shows a second deformation body component which in this embodiment comprises on its outer circumference a regular tooth arrangement that can engage the first deformation body component 56 shown in FIG. 4. The regular tooth arrangement of the embodiments shown in FIGS. 4 and 5 makes possible fixation in various angular positions, in the embodiment shown in the diagram due to the twelve teeth thus in total twelve angular positions at 30° increments. As already explained with reference to FIG. 4, the tooth arrangement can, however, also be provided in the form of a particular pattern, for example in order to permit only predetermined angular positions.

In the embodiment shown, the second deformation body component 57 comprises a driver element 55, which in the embodiment shown protrudes on one side beyond the lateral disc area. The rear of the second deformation body component 57, which rear is also shown in FIG. 5, also comprises a driver element, so that the driver elements 55 of two adjacent deformation bodies after a certain rotary angle distance engage each other on a shared axis of rotation, and a force acting on a deformation body can be transmitted to the adjacent deformation body 50.

Figure 6:
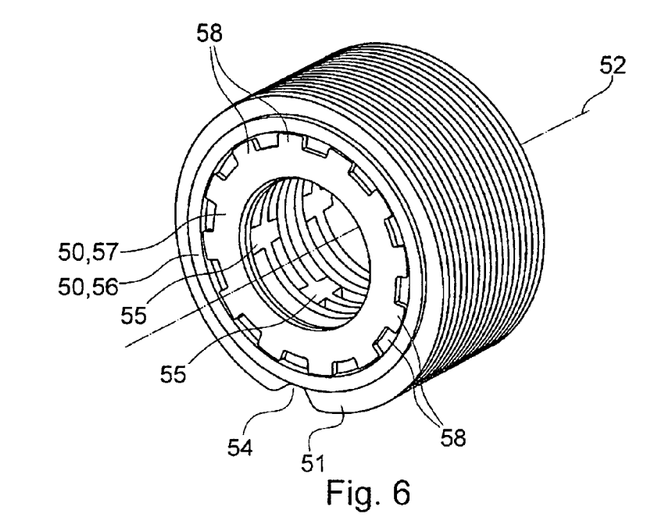
FIG. 6 shows an arrangement of several deformation bodies on a shared axis of rotation.

FIG. 6 shows an arrangement in which in each case a first deformation body component 56 and a second deformation body component 57 by way of the tooth arrangement 58 are fixed relative to each other in a particular angular position, thus forming a deformation body 50. A multitude of such deformation bodies are arranged side-by-side so that they are held rotatable on a shared axis 52 of rotation. In this arrangement the angular positions of the first deformation body components and of the second deformation body components are in each case fixed in relation to each other so that the recesses 54 of all the deformation bodies shown in the diagram are situated in a coincident angular position so that a singe deformation tool 40, for example in the form of a pin, can serve as a deformation tool for a multitude of deformation bodies. By fixing the first deformation body components 56 in different angular positions relative to the second deformation body components 57, the location of the driver elements 55 can be determined at different positions so that, for example, no driver elements 55 of two adjacent deformation bodies 50 are directly opposite each other, which would prevent installation by the necessary enmeshing. Instead, as a result of the different angular positions the corresponding position of the driver elements 55 can be fixed such that in the case of a force input to, for example, the front deformation body 50, the driver elements only engage each other after travelling a certain angular distance, for example in the present case of 60°, before force transmission from the frontmost deformation body to the second deformation body takes place. It is also possible to provide two or more driver elements 55 on each side of the deformation body 50 in order to achieve improved symmetrical force transmission. However, in the exemplary embodiment shown, the possible free-running angle distance is reduced as the number of driver elements is increased.

Figure 7:
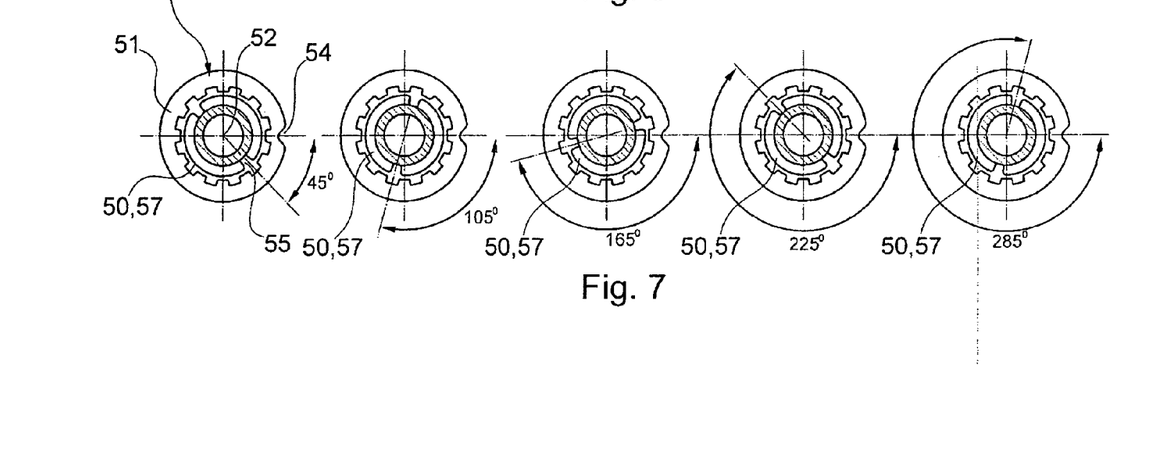
FIG. 7 shows an arrangement scheme of several deformation bodies for arrangement on a common axis of rotation.

FIG. 7 shows an exemplary arrangement diagram of first deformation body components 56 and second deformation body components 57, wherein the angular position between the recess 54 and the driver element 55 to each adjacent deformation body 50 differs by 60°. In this way successively at a distance of an angle of approximately 60° the respective next deformation body can be made to engage by means of the driver elements, and thus force transmission and thus energy input to the adjacent deformation body 50 can be achieved.

Of course, other assembly patterns are also possible, in particular if, for example, an increased deceleration effect, that is to say deformation of more than just one deformation body 50 is to take place at the same time, in that the angular offset is reduced and the free-run is shortened in this way, or deceleration action is to take place only later, in that, for example, the angular offset is not fixed to 60° but, for example, to 100° or more. In this way with a multitude of deformation bodies, in which the angular position of recess 54 and driver element 55 is fixed accordingly, a large number of different patterns can be achieved so that the number of the rotated deformation bodies over the distance of the angle of rotation increases with different characteristics. The greater the number of deformation bodies that rotate under the deformation tool 40 (not shown in FIGS. 6 and 7), the greater the energy that is input in the respective deformable region 51.

The system can be modularly expanded to an almost unlimited angular distance so that, for example if the first deformation body has traveled a complete circular path, thus the energy input only takes place as a result of friction between the deformation tool 40 and the surface of the deformable region 51, further deformation bodies situated further behind on the shared axis 52 of rotation still experience deformation in the deformable region 51, so that even then an increased energy input is still possible.

Figure 8:
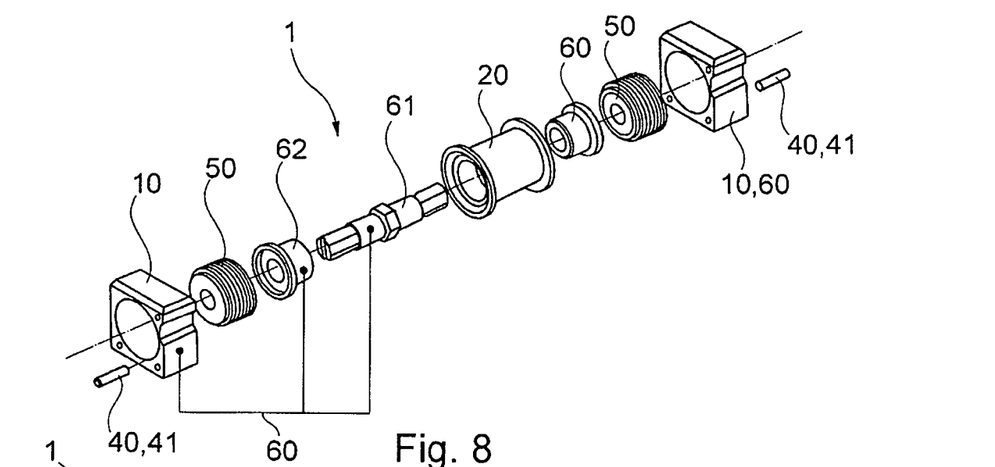
FIG. 8 shows an exploded view of a deceleration device according to the invention.

FIG. 8 shows an exploded view of a deceleration device 1 according to the invention, in which, for example, a stack of deformation bodies 50 described with reference to FIGS. 6 and 7 is provided, which deformation bodies 50 by a guide device 60 engage the deformation tool 40. By a corresponding force input in the frontmost deformation body 50, the force, which for example acts on a second component 20 in the form of a winding spool, can be transmitted, by way of a shaft 61 and a cover sleeve 62, to a deformation body 50 which is held in a predetermined plug pattern, for example in a housing component 10. In this arrangement the housing 10 can serve as a first component 10 of the deceleration device, by which the deceleration device is attached to a fixed component of an aircraft. By way of the second component 20, which in the diagram is provided in the shape of a spool, a movable component in an aircraft can be connected to the deceleration device 1, for example by way of a belt. In this arrangement the winding body 20 is plugged in a nonrotational manner into the shaft 61, for example by way of a hexagonal shape, wherein a sleeve 62 is connected, also in a nonrotational manner, to the shaft 61 for the purpose of force transmission. The sleeve 62 can, for example, again comprise a driver element 55 which engages the frontmost deformation body 50 of the deformation body stack, thus ensuring force transmission between the spool component 20 and the frontmost deformation body 50. In this arrangement the housing 10 can receive, for example, the deformation tool 40 in the form of a pin 41 and the stack of the deformation bodies, wherein all the recesses 54 of the deformation bodies 50 are situated so as to correspond to the deformation tool 40 that engages these recesses 54. If a force is exerted onto a belt wound onto the winding spool 20, the force is transmitted by way of the hexagonal shape onto the shaft 61 or the sleeve 62, from where it is transmitted to the frontmost deformation body 50. From there the further coupling of the deformation bodies 50 arranged behind takes place by way of the driver elements 55 in the manner described above in order to provide a desired deceleration characteristic. By means of a symmetrical design comprising two stacks of deformation bodies, one on each side of the shaft 61, force distributions can be optimised, and a compact design can be achieved.

Figure 9:
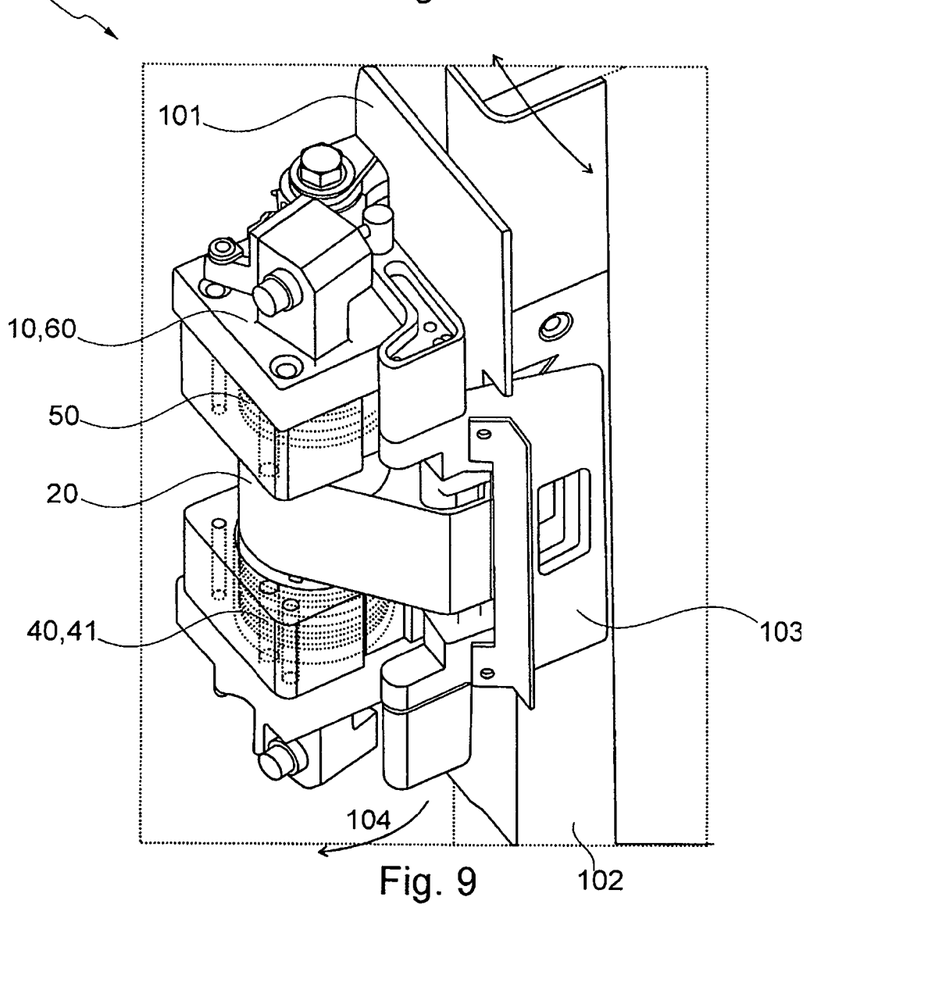
FIG. 9 shows an assembled deceleration device according to the present invention in an installed state.

FIG. 9 shows an assembled deceleration device 1 according to an exemplary embodiment, in which the middle spool 20 comprises a belt, by means of which the movable component 102 of an aircraft can be connected. In the embodiment shown the deceleration device 1 is installed in a fixed component 101 of an aircraft, for example in a door frame for a cockpit door. In the embodiment shown, the deceleration device 1 is installed on the side of the door frame 101, which side faces away from the door stop, with the decelerating device 1 comprising a catch hook which during normal opening and closing of the door moves away without connecting to the hinging door 102. However, if the door is subjected to extraordinary acceleration in a sudden decompression event, then, due to inertia, the connection hook 103 cannot move away fast enough to a hinge direction 104 and hooks into the door 102. In this process the belt that is wound on the spool 20 is hooked into the door 102 that hinges open, and unwinds from the spool body 20. During this unwinding process the force and energy that act on the door during decompression are transferred via the shaft 61 to the stack of deformation bodies 50, which stack experiences a deformation in the predefined pattern in the deformable regions 51, thus causing deceleration of the belt wound on the spool bodies 20.

Figure 10:
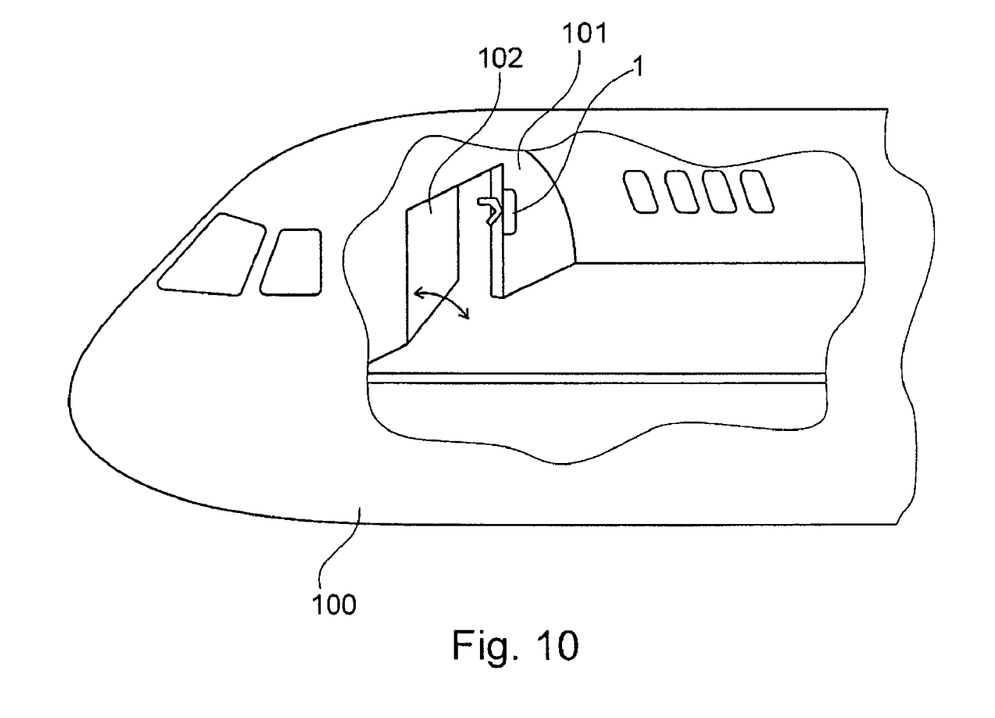
FIG. 10 shows an aircraft with an installed deceleration device according to the invention.

FIG. 10 shows an aircraft 100 with a deceleration device 10 in place, in the example shown a movable cockpit door 102 in a fixed door region 101. It should be noted that the deceleration device 1 can, of course, also be used for other movable components in an aircraft, which components are to be secured against abrupt movement, for example intermediate doors, flaps, doors to washroom- and toilet spaces, and also trolleys provided they can be attached to the deceleration device by a corresponding attachment device.

It should be noted that the present invention, apart from its use in the field of aviation, can also be used in other fields where securing of sudden movements and the compensation of considerable kinetic energy is required. This can, for example, also be the case in the context of ships or railways, in particular where as a result of decompression considerable action of force, as a result of pressure differentials, on large areas is to be expected, for example in the context of submarines. Furthermore, such a deceleration device can also be used in areas where there is a potential explosion hazard, where considerable damage as a result of fragments or debris can be counteracted by suitable deceleration of the fragment or debris.

In addition, it should be pointed out that "comprising" does not exclude other elements or steps, and "a" or "an" does not exclude several elements and steps. The reference characters used only serve to provide a better understanding, they should in no way be interpreted in a limiting manner, wherein the scope of protection of the invention is reflected by the claims.

The invention claimed is:

1. A deceleration device for a movable component in an aircraft, comprising:
    a deformation component;
    wherein the deformation component comprises:
    a deformation tool;
    a deformation body with a deformable region; and
    a guide device;
    wherein the deformation tool and the deformation body can be made to engage each other in such a manner by the guide device that in the case of movement of the deformation body and of the deformation tool relative to each other the deformable region of the deformation body can be deformed by the deformation tool;
    wherein the deformation body comprises:
    a first deformation body component; and
    a second deformation body component;
    wherein the first deformation body component comprises the deformation region, the second deformation body component comprises the driver element, and the first deformation body component and the second deformation body component can be fixed at different angular positions relative to each other.

2. The deceleration device of claim 1, further comprising:
    a first component; and
    a second component;
    wherein the first component can be connected to a fixed component of an aircraft, and the second component can be connected to a movable component in an aircraft,
    wherein the deformation device interconnects the first component with the second component such that the first component can be decelerated relative to the second component by deformation of the deformable region.

3. The deceleration device of claim 1,
wherein the deformable region is guided on an essentially circular path on an axis of rotation, and the deformation tool is arranged so as to be eccentric in relation to the axis of rotation.

4. The deceleration device of claim 1,
wherein the deformable region comprises an essentially circular contour, and the deformation tool acts upon the circular contour for deformation.

5. The deceleration device of claim 4,
wherein the circular contour comprises a recess which the deformation tool engages.

6. The deceleration device of claim 1,
wherein the deformable region is designed to be deformed by flanging.

7. A deceleration device for a movable component in an aircraft, comprising:
a deformation component;
wherein the deformation component comprises:
a deformation tool;
a deformation body with a deformable region; and
a guide device;
wherein the deformation tool and the deformation body can be made to engage each other in such a manner by the guide device that in the case of movement of the deformation body and of the deformation tool relative to each other the deformable region of the deformation body can be deformed by the deformation tool; and
a multitude of deformation bodies,
wherein each of the multitude of deformation bodies comprises a driver element that can be made to engage a driver element of another deformation body such that as a result of a movement of a deformation body the movement of another deformation body can be caused.

8. The deceleration device of claim 7,
wherein the multitude of deformation bodies are held, side-by-side, on a shared axis of rotation, and a driver element of a deformation body can be made to act upon a driver element of an adjacent deformation body.

9. The deceleration device of claim 1,
wherein the first deformation body component and the second deformation body component together are toothed with a regular tooth arrangement.

10. The deceleration device of claim 1,
wherein the deformation tool is a pin.

11. A deceleration device for a movable component in an aircraft, comprising:
a deformation component;
wherein the deformation component comprises:
a deformation tool;
a deformation body with a deformable region; and
a guide device;
wherein the deformation tool and the deformation body can be made to engage each other in such a manner by the guide device that in the case of movement of the deformation body and of the deformation tool relative to each other the deformable region of the deformation body can be deformed by the deformation tool;
wherein the deformation tool is a pin; and
a multitude of deformation bodies each having a pin;
wherein the multitude of deformation bodies are held side-by-side on a shared axis of rotation; and
wherein the pin of each deformation body engages a recess of another deformation body.

12. A cockpit door device comprising:
a door frame;
a door leaf; and
a deceleration device, the deceleration device comprising:
a deformation component;
wherein the deformation component comprises:
a deformation tool;
a deformation body with a deformable region; and
a guide device;
wherein the deformation tool and the deformation body can be made to engage each other in such a manner by the guide device that in the case of movement of the deformation body and of the deformation tool relative to each other the deformable region of the deformation body can be deformed by the deformation tool;
wherein a first component of the deceleration device is connected to the door frame, and the second component of the deceleration device in the case of decompression can be connected to the door leaf;
wherein the deceleration device interconnects the door frame with the door leaf in the case of decompression such that the door leaf can be decelerated relative to the door frame by deforming a deformable region.

* * * * *